(12) United States Patent
Cheng et al.

(10) Patent No.: US 9,729,007 B2
(45) Date of Patent: Aug. 8, 2017

(54) UNINTERRUPTIBLE POWER SUPPLYING METHOD AND UNINTERRUPTIBLE POWER SUPPLY

(71) Applicant: Huawei Technologies Co., Ltd., Shenzhen (CN)

(72) Inventors: Yang Cheng, Shenzhen (CN); Peiguo Liu, Shenzhen (CN); Mita Cai, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 14/549,389

(22) Filed: Nov. 20, 2014

(65) Prior Publication Data

US 2015/0076916 A1    Mar. 19, 2015

Related U.S. Application Data

(63) Continuation of application No. PCT/CN2014/073203, filed on Mar. 11, 2014.

(30) Foreign Application Priority Data

Jun. 28, 2013    (CN) .......................... 2013 1 0269839

(51) Int. Cl.
*H02J 7/00* (2006.01)
*H02J 9/00* (2006.01)
(Continued)

(52) U.S. Cl.
CPC .............. *H02J 9/062* (2013.01); *H02J 7/007* (2013.01); *H02J 9/005* (2013.01);
(Continued)

(58) Field of Classification Search
CPC ... H02J 9/062; H02J 7/00; H02J 9/005; Y10T 307/615
(Continued)

(56) References Cited

U.S. PATENT DOCUMENTS 6,295,215 B1    9/2001    Faria et al.
7,671,487 B2    3/2010    Wang et al.
(Continued)

FOREIGN PATENT DOCUMENTS

CN    101222148 A    7/2008
CN    201369680 Y    12/2009
(Continued)

OTHER PUBLICATIONS

Partial English Translation and Abstract of Chinese Patent Application No. CN102751874A, Dec. 12, 2014, 16 pages.
(Continued)

*Primary Examiner* — Carlos Amaya
(74) *Attorney, Agent, or Firm* — Conley Rose, P.C.

(57) ABSTRACT

An uninterruptible power supplying method and an uninterruptible power supply. The method includes switching an uninterruptible power supply to a bypass working mode from a main loop working mode, so as to provide mains power for a load through a bypass; determining the working mode of the uninterruptible power supply; and when the uninterruptible power supply is in the bypass working mode, adjusting a working frequency of at least one switch tube in a main loop of the uninterruptible power supply to a second frequency from a first frequency, where the second frequency is less than the first frequency, so as to reduce power loss when the uninterruptible power supply is in the bypass working mode.

20 Claims, 7 Drawing Sheets

(51) Int. Cl.
*H02J 9/06* (2006.01)
*H02M 5/458* (2006.01)
*H02J 7/34* (2006.01)
*H02M 1/00* (2006.01)

(52) U.S. Cl.
CPC ............ *H02M 5/4585* (2013.01); *H02J 7/34* (2013.01); *H02M 2001/007* (2013.01); *H02M 2001/0054* (2013.01); *Y02B 70/1491* (2013.01); *Y10T 307/615* (2015.04); *Y10T 307/625* (2015.04)

(58) Field of Classification Search
USPC .......................................................... 307/66
See application file for complete search history.

(56) References Cited

U.S. PATENT DOCUMENTS

| | | | |
|---|---|---|---|
| 7,893,650 B2 | 2/2011 | Arnet | |
| 2006/0221523 A1* | 10/2006 | Colombi | ................. H02J 9/062 361/90 |
| 2008/0012426 A1 | 1/2008 | Lu et al. | |

FOREIGN PATENT DOCUMENTS

| | | |
|---|---|---|
| CN | 101699702 A | 4/2010 |
| CN | 201541145 U | 8/2010 |
| CN | 102157980 A | 8/2011 |
| CN | 202221906 U | 5/2012 |
| CN | 102751874 A | 10/2012 |
| CN | 103337901 A | 10/2013 |
| EP | 1928081 A2 | 6/2008 |

OTHER PUBLICATIONS

Partial English Translation and Abstract of Chinese Patent Application No. CN201369680, Jan. 26, 2015, 13 pages.
Partial English Translation and Abstract of Chinese Patent Application No. CN101699702A, Dec. 30, 2014, 4 pages.
Partial English Translation and Abstract of Chinese Patent Application No. CN102157980A, Nov. 24, 2014, 3 pages.
Partial English Translation and Abstract of Chinese Patent Application No. CN103337901A, Nov. 24, 2014, 3 pages.
Partial English Translation and Abstract of Chinese Patent Application No. CN201541145A, Nov. 24, 2014, 14 pages.
Partial English Translation and Abstract of Chinese Patent Application No. CN202221906A, Nov. 24, 2014, 14 pages.
Foreign Communication From a Counterpart Application, PCT Application No. PCT/CN2014/073203, English Translation of International Search Report dated Jun. 11, 2014, 3 pages.
Foreign Communication From a Counterpart Application, PCT Application No. PCT/CN2014/073203, Written Opinion dated Jun. 11, 2014, 9 pages.
Foreign Communication From a Counterpart Application, Chinese Application No. 201310269839.0, Chinese Office Action dated Nov. 27, 2014, 6 pages.
Foreign Communication From a Counterpart Application, Chinese Application No. 201310269839.0, Chinese Search Report dated Nov. 18, 2014, 2 pages.
Foreign Communication From a Counterpart Application, European Application No. 14787085.1 Extended European Report dated Jul. 6, 2015, 7 pages.

* cited by examiner

UNINTERRUPTIBLE POWER SUPPLYING METHOD AND UNINTERRUPTIBLE POWER SUPPLY

CROSS-REFERENCE TO RELATED APPLICATION

This application is a continuation of International Application No. PCT/CN2014/073203, filed on Mar. 11, 2014, which claims priority to Chinese Patent Application No. 201310269839.0, filed on Jun. 28, 2013, both of which are hereby incorporated by reference in their entireties.

TECHNICAL FIELD

The present invention relates to the field of power supply technologies, and in particular, to an uninterruptible power supplying method and an uninterruptible power supply (UPS).

BACKGROUND

In addition to a function of uninterruptedly supplying power to a user, a UPS also has functions of improving power quality and providing high power quality. The UPS generally uses a double-conversion working mode. When the UPS works, the UPS needs to consume electric energy, and greater output power of the UPS indicates more consumed electric energy. For the purpose of energy saving, when the quality of a power grid is good, a concept of working in an economical operation mode (ECO-mode) is proposed, that is, the power grid provides mains power for a load of a user directly through a bypass line (also referred to as a static bypass) of the UPS, while a main part of the UPS is in a standby state, its output power is zero, consumed electric energy is low, and therefore the efficiency of the entire system is high.

In the ECO mode, although the main part of the UPS is in the standby state, certain energy is still consumed, which hinders an effective improvement on the efficiency of the entire system in the ECO mode.

SUMMARY

Embodiments of the present invention provide an uninterruptible power supplying method and an uninterruptible power supply, which can effectively improve efficiency when the uninterruptible power supply provides power for a load directly through a bypass of the UPS at a power grid.

A first aspect provides an uninterruptible power supplying method, including switching an uninterruptible power supply to a bypass working mode from a main loop working mode, so as to provide mains power for a load through a bypass; determining the working mode of the uninterruptible power supply; and when the uninterruptible power supply is in the bypass working mode, adjusting a working frequency of at least one switch tube in a main loop of the uninterruptible power supply to a second frequency from a first frequency, where the second frequency is less than the first frequency, so as to reduce power loss when the uninterruptible power supply is in the bypass working mode.

With reference to the first aspect, in a first possible implementation manner, the adjusting a working frequency of at least one switch tube in a main loop of the uninterruptible power supply to a second frequency from a first frequency includes adjusting the working frequency of any one or more switch tubes in one or more circuits of a rectifier circuit, a discharging circuit, an auxiliary power supply, a charging circuit, and an inverter circuit in the main loop to the second frequency from the first frequency.

With reference to the first possible implementation manner, in a second possible implementation manner, the method according to the first aspect further includes, when the uninterruptible power supply is switched to the bypass working mode from the main loop working mode and a voltage of a bus bar of the uninterruptible power supply is higher than a first threshold, stopping the rectifier circuit from working, and when the voltage of the bus bar is lower than a second threshold, enabling the rectifier circuit to work, where the rectifier circuit provides electric energy for the bus bar of the uninterruptible power supply, the inverter circuit extracts the electric energy from the bus bar (BUS), the first threshold is greater than the second threshold, and the first threshold and the second threshold are respectively an upper limit value and a lower limit value of a working voltage of the bus bar, or the first threshold and the second threshold are within a range of the working voltage of the bus bar; or, when the uninterruptible power supply is switched to the bypass working mode from the main loop working mode and a voltage of a bus bar of the uninterruptible power supply is higher than a first threshold, stopping the discharging circuit from working, and when the voltage of the bus bar is lower than a second threshold, enabling the discharging circuit to work, where the discharging circuit provides electric energy for the bus bar of the uninterruptible power supply, the inverter circuit extracts the electric energy from the bus bar, the first threshold is greater than the second threshold, and the first threshold and the second threshold are respectively, an upper limit value and a lower limit value of a working voltage of the bus bar, or the first threshold and the second threshold are within a range of the working voltage of the bus bar.

With reference to the first or second possible implementation manner, in a third possible implementation manner, the method according to the first aspect further includes determining an output voltage of a charger in the main loop; and when the uninterruptible power supply is switched to the bypass working mode from the main loop working mode and the output voltage of the charger in the main loop is higher than a third threshold, stopping the charger from providing power for the auxiliary power supply, and when the output voltage of the charger is lower than a fourth threshold, providing power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

With reference to any one of the foregoing possible implementation manners, in a fourth possible implementation manner, the method according to the first aspect further includes, when the uninterruptible power supply is switched to the bypass working mode from the main loop working mode, stopping at least one rectifier branch of multiple rectifier branches in the main loop from working, or stopping at least one discharging branch of multiple discharging branches in the main loop from working.

With reference to the first aspect or any one of the foregoing possible implementation manners, in a fifth possible implementation manner, the method according to the first aspect further includes, when the uninterruptible power supply is switched to the bypass working mode from the main loop working mode, stopping applying a drive signal to a switch tube of the inverter circuit, so as to stop the inverter circuit from working; and when the bypass is abnormal, providing the drive signal for the switch tube of the inverter circuit, so as to enable the inverter circuit to work.

A second aspect provides an uninterruptible power supplying method, including switching an uninterruptible power supply to a bypass working mode from a main loop working mode, so as to provide mains power for a load through a bypass; determining the working mode of the uninterruptible power supply; and when the uninterruptible power supply is switched to the bypass working mode from the main loop working mode and a voltage of a bus bar of the uninterruptible power supply is higher than a first threshold, stopping a rectifier circuit and/or a discharging circuit in a main loop from working, and when it is determined that the voltage of the bus bar in the main loop is lower than a second threshold, enabling the rectifier circuit and/or the discharging circuit to work, where the first threshold is greater than the second threshold, and the first threshold and the second threshold are respectively an upper limit value and a lower limit value of a working voltage of the bus bar, or the first threshold and the second threshold are within a range of the working voltage of the bus bar.

In a first possible implementation manner, the method according to the second aspect further includes determining an output voltage of a charger in the main loop; and when the uninterruptible power supply is switched to the bypass working mode from the main loop working mode and the output voltage of the charger in the main loop is higher than a third threshold, stopping the charger from providing power for an auxiliary power supply, and when the output voltage of the charger is lower than a fourth threshold, providing power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

A third aspect provides an uninterruptible power supplying method, including switching an uninterruptible power supply to a bypass working mode from a main loop working mode, so as to provide mains power for a load through a bypass; determining the working mode of the uninterruptible power supply; and when the uninterruptible power supply is switched to the bypass working mode from the main loop working mode, stopping at least one rectifier branch of multiple rectifier branches in a main loop from working, or stopping at least one discharging branch of multiple discharging branches in a main loop from working.

In a first possible implementation manner, the method according to the third aspect further includes, when the uninterruptible power supply is switched to the bypass working mode from the main loop working mode, stopping applying a drive signal to a switch tube of an inverter circuit, so as to stop the inverter circuit from working; and when the bypass is abnormal, providing the drive signal for the switch tube of the inverter circuit, so as to enable the inverter circuit to work.

A fourth aspect provides an uninterruptible power supply, including a main loop, including a rectifier circuit, an inverter circuit, an auxiliary power supply, and a charging circuit; a bypass configured to directly provide mains power for a load; and a control module configured to switch the uninterruptible power supply to a bypass working mode from a main loop working mode so as to provide the mains power for the load through the bypass, determine the working mode of the uninterruptible power supply, and when the uninterruptible power supply is in the bypass working mode, adjust a working frequency of at least one switch tube in the main loop of the uninterruptible power supply to a second frequency from a first frequency, where the second frequency is less than the first frequency, so as to reduce power loss when the uninterruptible power supply is in the bypass working mode.

With reference to the fourth aspect, in a first possible implementation manner, the control module adjusts the working frequency of any one or more switch tubes in one or more circuits of the rectifier circuit, a discharging circuit, the auxiliary power supply, the charging circuit, and the inverter circuit to the second frequency from the first frequency.

With reference to the first possible implementation manner, in a second possible implementation manner, the main loop further includes a bus bar. When the uninterruptible power supply is switched to the bypass working mode from the main loop working mode and a voltage of the bus bar of the uninterruptible power supply is higher than a first threshold, the control module stops the rectifier circuit from working, and when the voltage of the bus bar is lower than a second threshold, the control module enables the rectifier circuit to work, where the rectifier circuit provides electric energy for the bus bar of the uninterruptible power supply, the inverter circuit extracts the electric energy from the bus bar, the first threshold is greater than the second threshold, and the first threshold and the second threshold are respectively an upper limit value and a lower limit value of a working voltage of the bus bar, or the first threshold and the second threshold are within a range of the working voltage of the bus bar; or, when the uninterruptible power supply is switched to the bypass working mode from the main loop working mode and a voltage of the bus bar of the uninterruptible power supply is higher than a first threshold, the control module stops the discharging circuit from working, and when the voltage of the bus bar is lower than a second threshold, the control module enables the discharging circuit to work, where the discharging circuit provides electric energy for the bus bar of the uninterruptible power supply, the inverter circuit extracts the electric energy from the bus bar, the first threshold is greater than the second threshold, and the first threshold and the second threshold are respectively an upper limit value and a lower limit value of a working voltage of the bus bar, or the first threshold and the second threshold are within a range of the working voltage of the bus bar.

With reference to the first or second possible implementation manner, in a third first possible implementation manner, the main loop further includes a charger. The control module determines an output voltage of the charger in the main loop; when the uninterruptible power supply is switched to the bypass working mode from the main loop working mode and the output voltage of the charger in the main loop is higher than a third threshold, the control module stops the charger from providing power for the auxiliary power supply, and when the output voltage of the charger is lower than a fourth threshold, the control module enables the charger to provide power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

With reference to any one of the foregoing possible implementation manners of the fourth aspect, in a fourth possible implementation manner, the main loop includes multiple rectifier branches and multiple discharging branches; when the uninterruptible power supply is switched to the bypass working mode from the main loop working mode, the control module further stops at least one rectifier branch of the multiple rectifier branches in the main loop from working, or stops at least one discharging branch of the multiple discharging branches in the main loop from working.

With reference to any one of the foregoing possible implementation manners of the fourth aspect, in a fifth possible implementation manner, when the uninterruptible power supply is switched to the bypass working mode from the main loop working mode, the control module further stops applying a drive signal to a switch tube of the inverter circuit, so as to stop the inverter circuit from working; when the bypass is abnormal, the control module provides the drive signal for the switch tube of the inverter circuit, so as to enable the inverter circuit to work.

A fifth aspect provides an uninterruptible power supply, including a main loop, including a rectifier circuit, a discharging circuit, a bus bar, and an inverter circuit, where the rectifier circuit provides electric energy for the bus bar, and the inverter circuit extracts the electric energy from the bus bar; a bypass configured to directly provide mains power for a load; and a control module configured to switch the uninterruptible power supply to a bypass working mode from a main loop working mode so as to provide the mains power for the load through the bypass, determine the working mode of the uninterruptible power supply, and when the uninterruptible power supply is switched to the bypass working mode from the main loop working mode and a voltage of the bus bar of the uninterruptible power supply is higher than a first threshold, stop the rectifier circuit and/or the discharging circuit in the main loop from working, and when it is determined that the voltage of the bus bar in the main loop is lower than a second threshold, enable the rectifier circuit and/or the discharging circuit to work, where the first threshold is greater than the second threshold, and the first threshold and the second threshold are respectively an upper limit value and a lower limit value of a working voltage of the bus bar, or the first threshold and the second threshold are within a range of the working voltage of the bus bar.

With reference to the fifth aspect, in a first possible implementation manner, the main loop further includes a charger and an auxiliary power supply, where the charger of the uninterruptible power supply provides power for the auxiliary power supply of the uninterruptible power supply. The control module is further configured to determine an output voltage of the charger in the main loop; and when the uninterruptible power supply is switched to the bypass working mode from the main loop working mode and the output voltage of the charger in the main loop is higher than a third threshold, stop the charger from providing power for the auxiliary power supply, and when the output voltage of the charger is lower than a fourth threshold, provide power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

A sixth aspect provides an uninterruptible power supply, including a main loop, including multiple rectifier branches and multiple discharging branches; a bypass configured to directly provide mains power a load; and a control module configured to switch the uninterruptible power supply to a bypass working mode from a main loop working mode, so as to provide the mains power for the load through the bypass, determine the working mode of the uninterruptible power supply, and when the uninterruptible power supply is switched to the bypass working mode from the main loop working mode, stop at least one rectifier branch of the multiple rectifier branches in the main loop from working, or stop at least one discharging branch of the multiple discharging branches in the main loop from working.

With reference to the sixth aspect, in a first possible implementation manner, the main loop further includes an inverter circuit. When the uninterruptible power supply is switched to the bypass working mode from the main loop working mode, the control module further stops applying a drive signal to a switch tube of the inverter circuit, so as to stop the inverter circuit from working; when the bypass is abnormal, the control module provides the drive signal for the switch tube of the inverter circuit, so as to enable the inverter circuit to work.

According to the embodiments of the present invention, when an uninterruptible power supply is switched to run in a bypass working mode, a working frequency of a switch tube in a main loop of the uninterruptible power supply can decrease, thereby reducing working loss of the uninterruptible power supply and effectively improving working efficiency of the uninterruptible power supply.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part of the embodiments of the present invention rather than all of the embodiments. All other embodiments obtained by a person of ordinary skill in the art based on the embodiments of the present invention without creative efforts shall fall within the protection scope of the present invention.

A UPS can provide electric energy for a load in an online mode and an ECO mode according to mains power quality. For example, the online mode is used in a case in which the mains power quality is not good, and the ECO mode is used in a case in which the mains power quality is good. The ECO mode is also referred to as an energy-saving running mode, a bypass mode, or a power saving mode. The UPS can provide power for the load using two passages, an online main loop (also referred to as a double-conversion loop) and a bypass. When the online mode is used, if the mains power is normal, the online main loop formed by a rectifier and an inverter provides power for the load, and if the mains power fails, a discharging loop formed by a battery and an inverter of the UPS provides power for the load. When the ECO mode is used, the online main loop of the UPS is in a standby state, the bypass is in an active state, and the mains power is provided for the load. The UPS can continuously monitor mains input; in a case in which the mains power quality is good, the UPS is switched to run in a bypass working mode, and when the mains power quality decreases to a certain degree, switching is performed so that the inverter of the UPS provides electric energy for the load. Herein, the mains power may refer to alternating current provided by a power grid, and the embodiments of the present invention are not limited thereto; the mains power may refer to a power supply whose voltage, waveform, frequency, grounding system, and impedance are the same as or similar to those of alternating current provided by the online main loop.

For the convenience of describing uninterruptible power supplying methods in the embodiments of the present invention, the following first describes the structure and a working principle of a specific UPS.

Figure 1:
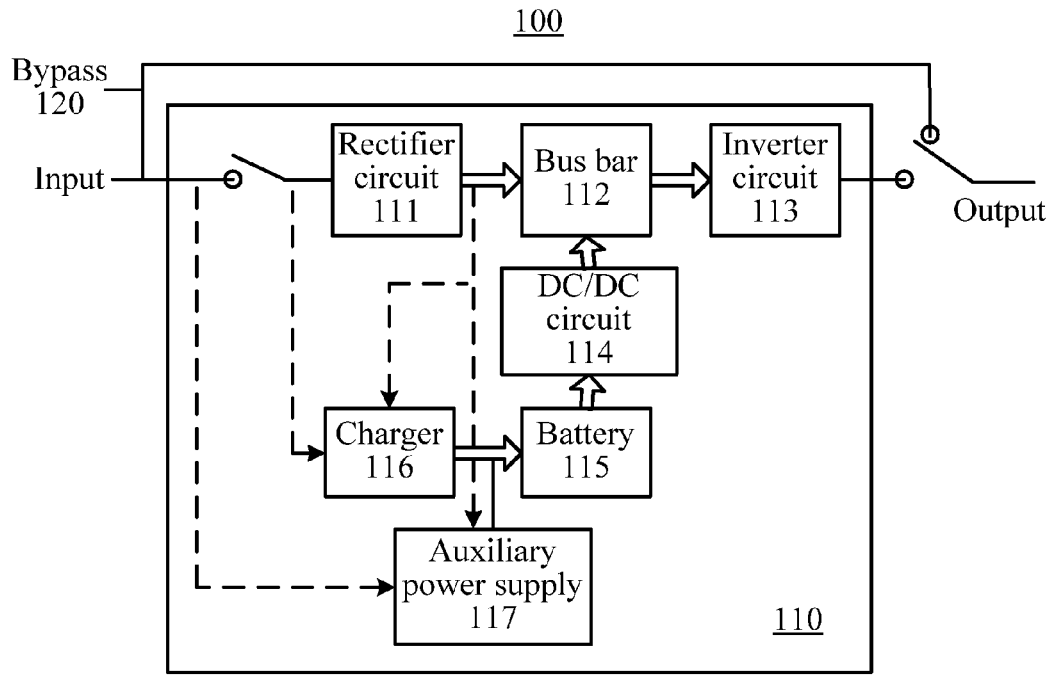
FIG. 1 is a schematic structural diagram of an uninterruptible power supply.

FIG. 1 is a schematic structural diagram of an uninterruptible power supply 100. The uninterruptible power supply 100 includes a main loop 110 and a bypass 120. The main loop 110 includes a rectifier circuit 111, a bus bar 112, an inverter circuit 113, a direct current to direct current (DC/DC) circuit 114, a battery 115, a charger 116, and an auxiliary power supply 117.

When the uninterruptible power supply 100 uses an online mode, the rectifier circuit 111 may convert input mains power into a direct current by means of rectification and apply the mains power to the bus bar 112; then, the inverter 113 converts a voltage of the bus bar 112 into an alternating current voltage by means of inversion and provides power for a load. When the uninterruptible power supply 100 uses an ECO mode, the bypass 120 is used for the bypass of the uninterruptible power supply, that is the bypass 120 is configured to directly provide mains power for the load, that is, when the uninterruptible power supply 100 uses the ECO mode, the mains power is directly provided for the load through the bypass 120, so that the uninterruptible power supply is switched to run in a bypass working mode, that is, the mains power is directly provided for the load. The charger 116 is configured to charge the battery 115, and may be powered by the bus bar 112 or the mains power. The auxiliary power supply 117 is configured to provide a working power supply for each part of the uninterruptible power supply 100, and may be powered by the bus bar 112, the mains power, and/or the charger 116. When the uninterruptible power supply 100 uses the online mode, if the mains power fails, an output of the battery 115 may be applied to the bus bar 112 through the direct current to direct current (DC/DC) circuit 114 (a discharging circuit), thereby ensuring that power is supplied to the load uninterruptedly. Generally, the charger 116 is stopped. Energy of the bus bar 112 is provided by the battery 115. If the charger works, energy goes to the battery 115 from the bus bar 112 through the charger 116, and then goes to the bus bar 112 from the battery 115 through the DC/DC circuit 114. In a special case, the bus bar 112 may extract electricity from the bypass 120 through the inverter circuit 113; in this way, the charger 116 can work and charge the battery 115.

The uninterruptible power supply in FIG. 1 is a specific embodiment of the present invention, and a person skilled in the art should understand that the uninterruptible power supply may include only some of the foregoing components. For example, in another embodiment of the present invention, the uninterruptible power supply may not include the rectifier circuit 111 or the DC/DC circuit 114.

Figure 2:
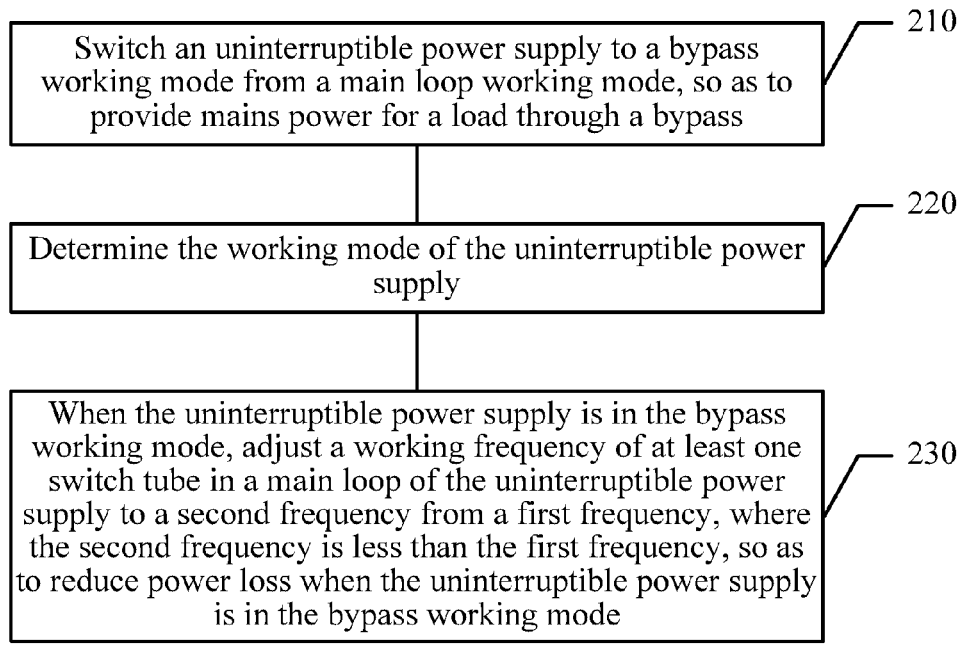
FIG. 2 is a schematic flowchart of an uninterruptible power supplying method according to an embodiment of the present invention.

FIG. 2 is a schematic flowchart of an uninterruptible power supplying method according to an embodiment of the present invention.

210: Switch an uninterruptible power supply to a bypass working mode from a main loop working mode, so as to provide mains power for a load through a bypass.

When the uninterruptible power supply is working, the uninterruptible power supply is generally in the main loop working mode, and it may be switched to the bypass working mode in some cases. According to this embodiment of the present invention, the uninterruptible power supply may be manually switched to run in the bypass working mode. For example, when a user expects the uninterruptible power supply to use an ECO mode, the user may manually switch, using a manual button on the uninterruptible power supply, the uninterruptible power supply to run in the bypass working mode. Optionally, as another embodiment, mains power quality may be first checked, and then the uninterruptible power supply is switched to run in the bypass working mode according to a check result. For example, a dedicated check module may be arranged on the uninterruptible power supply to check the mains power quality; when the mains power quality is good, a control module switches the uninterruptible power supply to the bypass from a main loop, that is, the uninterruptible power supply runs in the ECO mode; when the mains power quality is not good, the control module switches the uninterruptible power supply to the main loop from the bypass, so that an inverter of the uninterruptible power supply provides power for the load, that is, the uninterruptible power supply runs in an online mode.

220: Determine the working mode of the uninterruptible power supply.

For example, the uninterruptible power supply may determine, according to a manual input of the user or according to the foregoing check result, whether the uninterruptible power supply is in the bypass working mode or the main loop working mode.

230: When the uninterruptible power supply is in the bypass working mode, adjust a working frequency of at least one switch tube in a main loop of the uninterruptible power supply to a second frequency from a first frequency, where the second frequency is less than the first frequency, so as to reduce power loss when the uninterruptible power supply is in the bypass working mode.

For example, when the uninterruptible power supply is switched to run in the bypass working mode and enters the ECO mode, a controller or the control module of the uninterruptible power supply may change the working frequency of the switch tube in a main circuit of the uninterruptible power supply.

According to this embodiment of the present invention, when an uninterruptible power supply is switched to run in a bypass working mode, a working frequency of a switch tube in a main loop of the uninterruptible power supply can decrease, thereby reducing working loss of the uninterruptible power supply and effectively improving working efficiency of the uninterruptible power supply.

In 230, the working frequency of any one or more switch tubes in one or more circuits of a rectifier circuit, a discharging circuit, an auxiliary power supply, a charging circuit, and an inverter circuit in the main loop may be adjusted to the second frequency from the first frequency.

According to this embodiment of the present invention, when the uninterruptible power supply is switched to run in the bypass working mode, the working frequency of any one or more switch tubes (for example, a main switch tube) in the rectifier circuit, the discharging circuit, the auxiliary power supply, and the inverter circuit of the uninterruptible power supply can decrease, thereby reducing loss of the rectifier circuit, the inverter circuit, the auxiliary power supply, or the discharging circuit of the uninterruptible power supply and improving efficiency of the entire system of the uninterruptible power supply.

For example, the rectifier circuit may convert energy of input mains power into a direct current and send the direct current to a bus bar. In the ECO mode, the inverter circuit does not output power, and the rectifier circuit needs to provide only little energy for the bus bar; therefore, a working frequency of a switch tube of the rectifier circuit can be reduced when it is ensured that a voltage of the bus bar fluctuates in a reliable range, thereby reducing working loss of the rectifier circuit. In addition, in a case in which a charger extracts electricity from the bus bar and charges a battery and the auxiliary power supply extracts electric energy from the bus bar, the energy demanded by the charger and the auxiliary power supply is much smaller when compared with output power of the entire system; therefore, even if a working frequency of the rectifier circuit is reduced, the demand of the entire system for power supplying can still be met. In the ECO mode, the inverter circuit is in a standby state and does not output power. Therefore, a working frequency of a switch tube of the inverter circuit can also be reduced, and working loss of the inverter circuit is reduced while quality of output electric energy is ensured.

In the ECO mode, multiple parts of the uninterruptible power supply are in the standby state or a low-speed running state, particularly a fan. The fan generally rotates at a low speed or stops rotating. Therefore, output power of the auxiliary power supply (auxiliary source) can be reduced, so that a working frequency of a switch tube of the auxiliary power supply can also be reduced, thereby reducing working loss of the auxiliary power supply. In this case, a working current of the entire system is very small, and a reduction in the working frequency has little impact on noise and waveform quality; therefore, working of the entire system is not affected.

Optionally, as another embodiment, the method in FIG. 2 further includes, when the uninterruptible power supply is switched to the bypass working mode from the main loop working mode and the voltage of the bus bar of the uninterruptible power supply is higher than a first threshold, stopping the rectifier circuit from working; and when the voltage of the bus bar is lower than a second threshold, enabling the rectifier circuit to work, where the rectifier circuit provides electric energy for the bus bar of the uninterruptible power supply, the inverter circuit extracts the electric energy from the bus bar, the first threshold is greater than the second threshold, and the first threshold and the second threshold are respectively an upper limit value and a lower limit value of a working voltage of the bus bar, or the first threshold and the second threshold are within a range of the working voltage of the bus bar.

Optionally, as another embodiment, the method in FIG. 2 further includes, when the uninterruptible power supply is switched to the bypass working mode from the main loop working mode and the voltage of the bus bar of the uninterruptible power supply is higher than a first threshold, stopping the discharging circuit from working; and when the voltage of the bus bar is lower than a second threshold, enabling the discharging circuit to work, where the discharging circuit provides electric energy for the bus bar of the uninterruptible power supply, the inverter circuit extracts the electric energy from the bus bar, the first threshold is greater than the second threshold, and the first threshold and the second threshold are respectively an upper limit value and a lower limit value of a working voltage of the bus bar, or the first threshold and the second threshold are within a range of the working voltage of the bus bar.

For the rectifier circuit, in the ECO mode, each part of the uninterruptible power supply extracts very little energy from the bus bar; therefore, even though the rectifier circuit does not supplement energy for the bus bar, energy stored on the bus bar can ensure that each part that extracts electric energy from the bus bar can work normally for quite a long time. This embodiment of the present invention provides a voltage hysteresis method. The rectifier circuit first raises the energy (or the voltage) of the bus bar to a set threshold (for example, the first threshold) in a period, and then the rectifier circuit stops working; in this case, the energy stored on the bus bar is provided for each part. The voltage of the bus bar decreases slowly, and when the voltage of the bus bar decreases to a set threshold (for example, the second threshold), the rectifier circuit begins to work again, provides energy for the bus bar, and raises the voltage of the bus bar to the first threshold. This process repeats to ensure normal running of the entire system. In this working manner, the rectifier circuit works intermittently and does not work in quite a long time; therefore, the loss can be reduced.

Optionally, as another embodiment, the method in FIG. 2 further includes determining an output voltage of the charger in the main loop; and when the uninterruptible power supply is switched to the bypass working mode from the main loop working mode and the output voltage of the charger in the main loop is higher than a third threshold, stopping the charger from providing power for the auxiliary power supply, and when the output voltage of the charger is lower than a fourth threshold, providing power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

For a circuit structure in which the auxiliary power supply extracts electric energy from the charger, the energy demanded by the auxiliary power supply is also small in the ECO mode; therefore, the charger may also provide power for the auxiliary power supply when working in a voltage hysteresis manner, thereby reducing the loss of the charger.

Optionally, as another embodiment, the method in FIG. 2 further includes, when the uninterruptible power supply is switched to the bypass working mode from the main loop working mode, stopping at least one rectifier branch of multiple rectifier branches in the main loop from working, or stopping at least one discharging branch of multiple discharging branches in the main loop from working.

A switch tube in the rectifier branch/the discharging branch may be stopped from working, so as to stop the rectifier branch/the discharging branch from working, or electric energy may be stopped from being input to the rectifier/discharging branch, so as to stop the rectifier/discharging branch from working.

For the rectifier circuit, in a case in which the rectifier circuit of the uninterruptible power supply includes two or more rectifier branches, the bus bar needs little energy in the ECO mode; therefore, some of the rectifier branches may be closed, and some of the rectifier branches may be kept working, for example, only one rectifier branch is kept working to provide energy for the bus bar. Because some of the rectifier branches stop working, the loss of the uninterruptible power supply can be reduced.

For the discharging circuit, in a case in which the discharging circuit of the uninterruptible power supply includes two or more discharging branches, the bus bar needs little energy in the ECO mode; therefore, some of the discharging branches may be closed, and some of the discharging branches may be kept working, for example, only one discharging branch is kept working to provide energy for the bus bar. Because some of the discharging branches stop working, the loss of the uninterruptible power supply can be reduced.

Optionally, as another embodiment, the method FIG. 2 further includes, when the uninterruptible power supply is switched to the bypass working mode from the main loop working mode, stopping applying a drive signal to a switch tube of the inverter circuit, so as to stop the inverter circuit from working; and when the bypass is abnormal, providing the drive signal for the switch tube of the inverter circuit, so as to enable the inverter circuit to work. For example, the drive signal of the inverter circuit may be turned off, or the drive signal of the inverter circuit may be kept in a low level.

If the time from the moment when the inverter circuit is started from a turned-off state to the moment when the inverter circuit can provide electric energy for the user meets the requirement of reliably providing power for the load, that is, if the inverter circuit can be started in time and provide power for the load in a case in which the bypass is abnormal and cannot continue to reliably provide electric energy for the load, the inverter may be turned off in the ECO mode, thereby reducing the loss.

Figure 3:
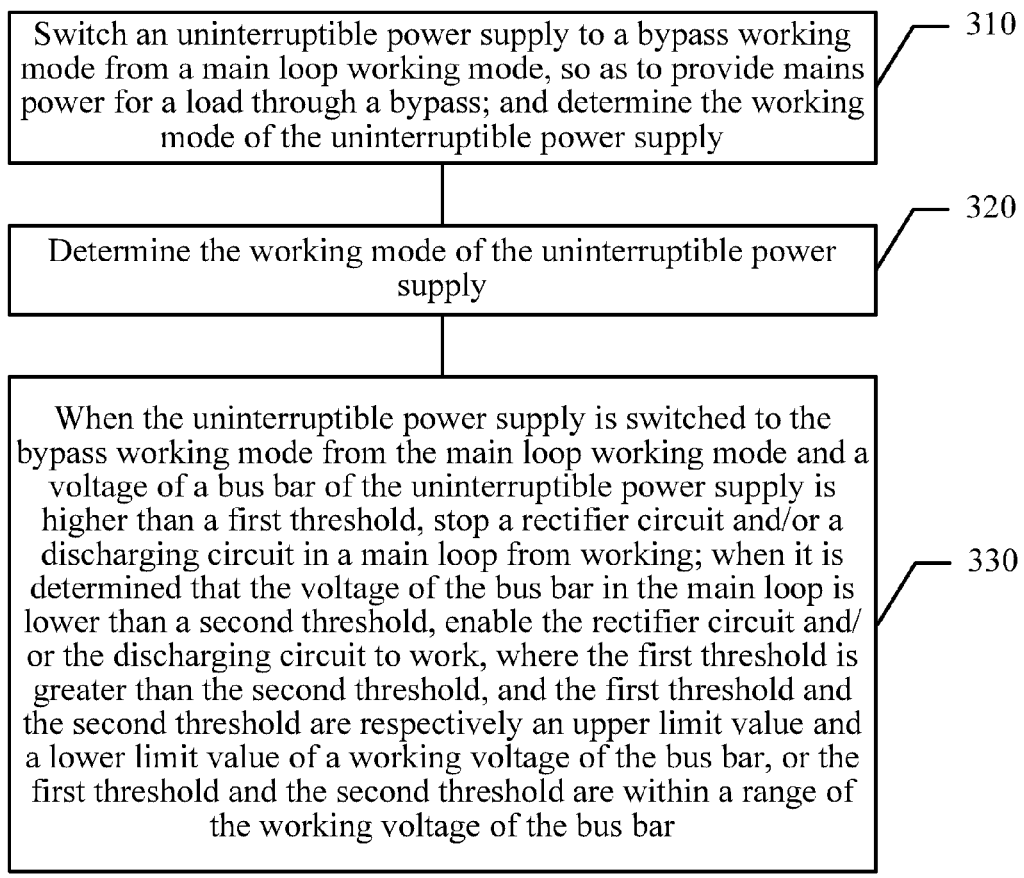
FIG. 3 is a schematic flowchart of an uninterruptible power supplying method according to another embodiment of the present invention.

FIG. 3 is a schematic flowchart of an uninterruptible power supplying method according to another embodiment of the present invention.

310: Switch an uninterruptible power supply to a bypass working mode from a main loop working mode, so as to provide mains power for a load through a bypass; and determine the working mode of the uninterruptible power supply. This is similar to step 210 in the embodiment in FIG. 2, and details are not described herein again.

320: Determine the working mode of the uninterruptible power supply. This is similar to step 220 in the embodiment in FIG. 2, and details are not described herein again.

330: When the uninterruptible power supply is switched to the bypass working mode from the main loop working mode and a voltage of a bus bar of the uninterruptible power supply is higher than a first threshold, stop a rectifier circuit and/or a discharging circuit in a main loop from working; when it is determined that the voltage of the bus bar in the main loop is lower than a second threshold, enable the rectifier circuit and/or the discharging circuit to work, where the first threshold is greater than the second threshold, and the first threshold and the second threshold are respectively an upper limit value and a lower limit value of a working voltage of the bus bar, or the first threshold and the second threshold are within a range of the working voltage of the bus bar.

For the rectifier circuit, in an ECO mode, each part of the uninterruptible power supply extracts very little energy from the bus bar; therefore, even though the rectifier circuit does not supplement energy for the bus bar, energy stored on the bus bar can ensure that each part that extracts electric energy from the bus bar can work normally for quite a long time. This embodiment of the present invention provides a voltage hysteresis method. The rectifier circuit first raises the energy (or the voltage) of the bus bar to a set threshold (for example, the first threshold) in a period, and then the rectifier circuit stops working; in this case, the energy stored on the bus bar is provided for each part. The voltage of the bus bar decreases slowly, and when the voltage of the bus bar decreases to a set threshold (for example, the second threshold), the rectifier circuit begins to work again, provides energy for the bus bar, and raises the voltage of the bus bar to the first threshold. This process repeats to ensure normal running of the entire system. In this working manner, the rectifier circuit works intermittently and does not work in quite a long time; therefore, the loss can be reduced.

According to this embodiment of the present invention, when an uninterruptible power supply is switched to run in a bypass working mode, in a case in which it is determined that a voltage of a bus bar of the uninterruptible power supply is higher than a first threshold, a rectifier circuit and/or a discharging circuit is stopped from working; in a case in which it is determined that the voltage of the bus bar is lower than a second threshold, the rectifier circuit and/or the discharging circuit is enabled to work, thereby reducing working loss of the uninterruptible power supply and effectively improving working efficiency of the uninterruptible power supply.

Optionally, as another embodiment, the method in FIG. 3 further includes determining an output voltage of a charger in the main loop; and when the uninterruptible power supply is switched to the bypass working mode from the main loop working mode and the output voltage of the charger in the main loop is higher than a third threshold, stopping the charger from providing power for an auxiliary power supply, and when the output voltage of the charger is lower than a fourth threshold, providing power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

For a circuit structure in which the auxiliary power supply extracts electric energy from the charger, the energy demanded by the auxiliary power supply is also small in the ECO mode; therefore, the charger may also provide power for the auxiliary power supply when working in a voltage hysteresis manner, thereby reducing loss of the charger.

Figure 4:
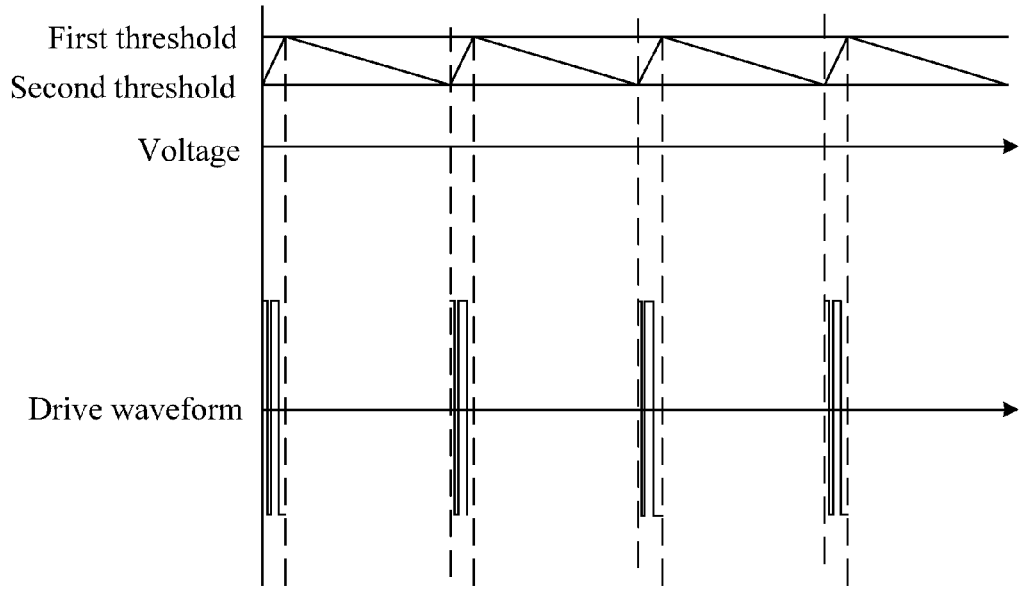
FIG. 4 is a schematic diagram of a voltage hysteresis method according to an embodiment of the present invention.

FIG. 4 is a schematic diagram of a voltage hysteresis method according to an embodiment of the present invention.

Referring to FIG. 4, when a voltage of a bus bar is lower than a second threshold, a drive circuit of a rectifier circuit generates a drive signal (a drive waveform as shown in FIG. 4), so that the rectifier circuit works and provides electric energy for the bus bar, and the voltage of the bus bar rises; when the voltage of the bus bar is higher than a first threshold, the drive circuit of the rectifier circuit stops generating the drive signal, so that the rectifier circuit stops working and no longer provides the electric energy for the bus bar, and the voltage of the bus bar decreases because the electric energy is extracted by an inverter circuit; when the voltage of the bus bar decreases to the second threshold, the drive circuit of the rectifier circuit re-generates the drive signal, so that the voltage of the bus bar is kept between the first threshold and the second threshold. It should be understood that, the first threshold and the second threshold may be set by a person of ordinary skill in the art according to needs, as long as the voltage of the bus bar can ensure that each part that extracts electric energy from the bus bar can work normally.

Similarly, for a voltage hysteresis method of a charger, when an output voltage of the charger is lower than a fourth threshold, a drive signal is generated, so that the charger provides electric energy for an auxiliary power supply, and the output voltage of the charger rises; when the output voltage of the charger is higher than a third threshold, the charger stops providing the electric energy for the auxiliary power supply, so that the output voltage of the charger decreases; when the output voltage of the charger decreases to the fourth threshold, the drive signal is generated again, so that the charger provides the electric energy for the auxiliary power supply again and a voltage provided by the charger for the auxiliary power supply is kept between the third threshold and the fourth threshold. It should be understood that, the third threshold and the fourth threshold may be set by a person of ordinary skill in the art according to needs, as long as the voltage provided for the auxiliary power supply can ensure that each part that extracts electric energy from the auxiliary power supply can work normally.

Figure 5:
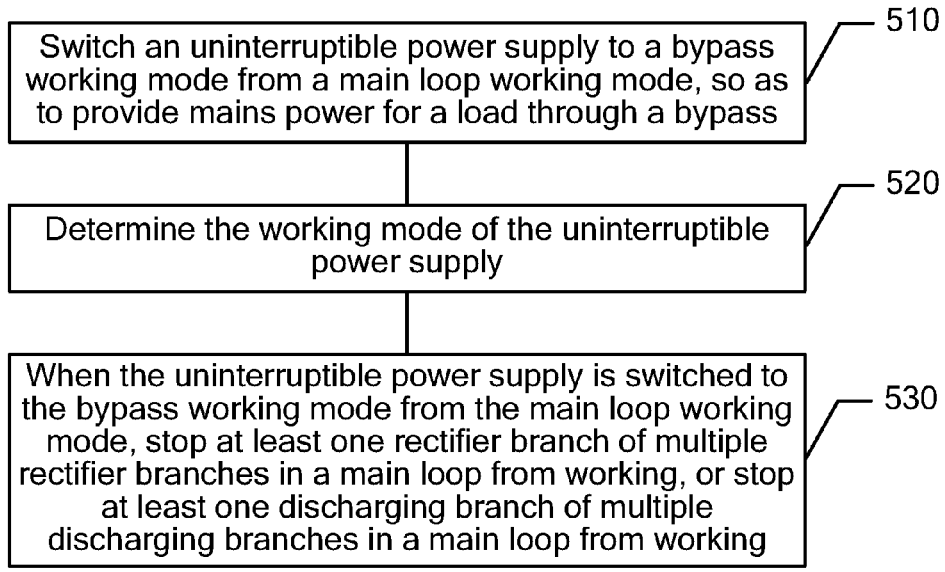
FIG. 5 is a schematic flowchart of an uninterruptible power supplying method according to another embodiment of the present invention.

FIG. 5 is a schematic flowchart of an uninterruptible power supplying method according to another embodiment of the present invention.

510: Switch an uninterruptible power supply to a bypass working mode from a main loop working mode, so as to provide mains power for a load through a bypass. This is similar to step 210 in FIG. 2, and details are not described herein again.

520: Determine the working mode of the uninterruptible power supply. This is similar to step 220 in FIG. 2, and details are not described herein again.

530: When the uninterruptible power supply is switched to the bypass working mode from the main loop working mode, stop at least one rectifier branch of multiple rectifier branches in a main loop from working, or stop at least one discharging branch of multiple discharging branches in a main loop from working.

For a rectifier circuit, in a case in which the rectifier circuit of the uninterruptible power supply includes two or more rectifier branches, a bus bar needs little energy in an ECO mode; therefore, some of the rectifier branches may be closed, and some of the rectifier branches may be kept working, for example, only one rectifier branch is kept working to provide energy for the bus bar. Because some of the rectifier branches stop working, loss of the uninterruptible power supply can be reduced.

For a discharging circuit, in a case in which the discharging circuit of the uninterruptible power supply includes two or more discharging branches, the bus bar needs little energy in the ECO mode; therefore, some of the discharging branches may be closed, and some of the discharging branches may be kept working, for example, only one discharging branch is kept working to provide energy for the bus bar. Because some of the discharging branches stop working, loss of the uninterruptible power supply can be reduced.

According to this embodiment of the present invention, when an uninterruptible power supply is switched to run in a bypass working mode, in a case in which it is determined that a voltage of a bus bar of the uninterruptible power supply is higher than a first threshold, at least one rectifier branch of multiple rectifier branches or at least one discharging branch of multiple discharging branches in the uninterruptible power supply is stopped from working, thereby reducing working loss of the uninterruptible power supply and effectively improving working efficiency of the uninterruptible power supply. For example, a drive signal of the rectifier branch or the discharging branch may be turned off, or the drive signal may be kept in a low level.

Optionally, as another embodiment, the method in FIG. 5 further includes, when the uninterruptible power supply is switched to the bypass working mode from the main loop working mode, stopping applying a drive signal to a switch tube of an inverter circuit, so as to stop the inverter circuit from working; and when the bypass is abnormal, providing the drive signal for the switch tube of the inverter circuit, so as to enable the inverter circuit to work.

If the time from the moment when the inverter circuit is started from a turned-off state to the moment when the inverter circuit can provide electric energy for a user meets the requirement of reliably providing power for the load, that is, if the inverter circuit can be started in time and provide power for the load in a case in which the bypass is abnormal and cannot continue to reliably provide electric energy for the load, the inverter may be turned off in the ECO mode, thereby reducing the loss.

Figure 6:
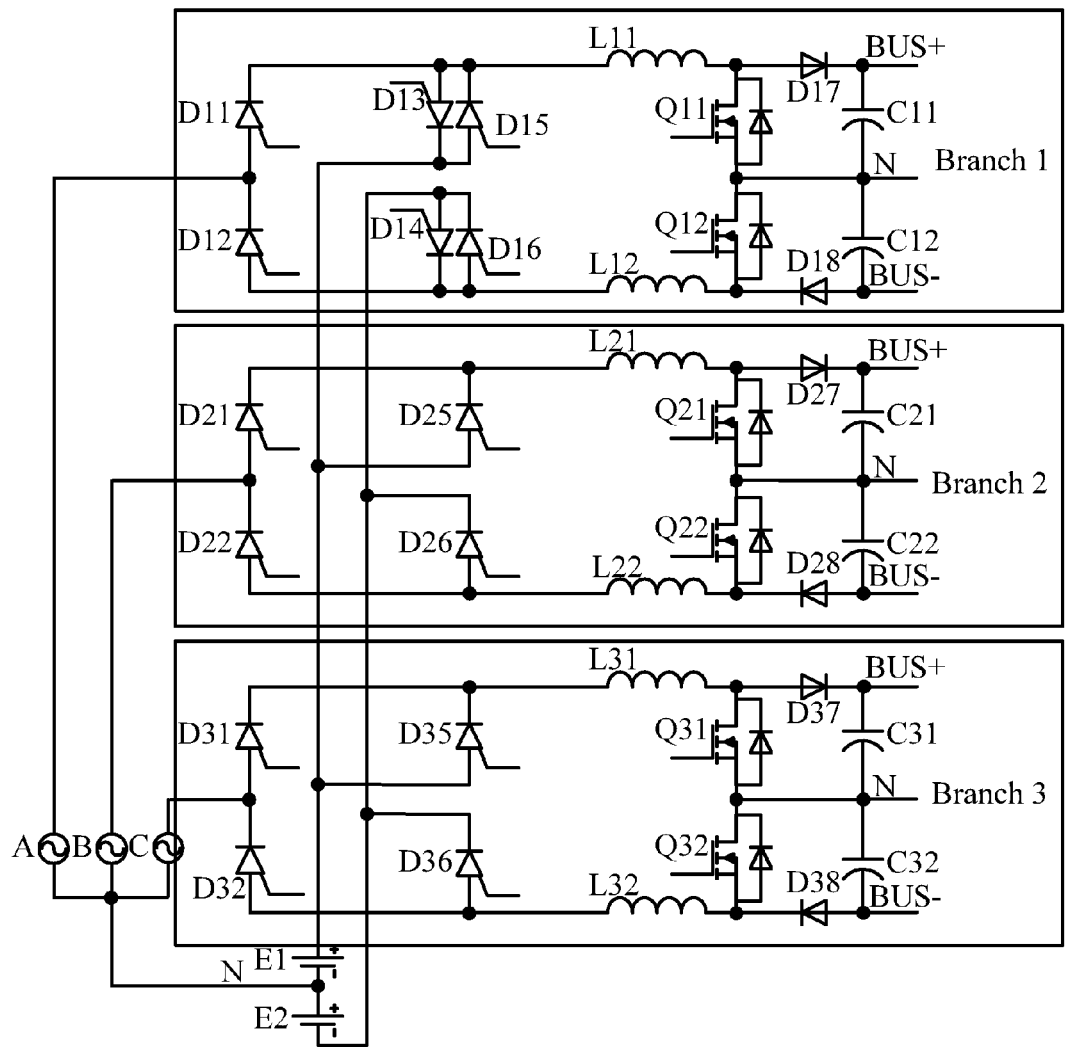
FIG. 6 is a schematic circuit diagram of a rectifier circuit of an uninterruptible power supply according to an embodiment of the present invention.

FIG. 6 is a schematic circuit diagram of a rectifier circuit of an uninterruptible power supply according to an embodiment of the present invention, which is powered by two batteries in series: E1 and E2.

A main loop of the uninterruptible power supply in FIG. 6 includes three rectifier branches, a rectifier branch 1, a rectifier branch 2, and a rectifier branch 3. The rectifier branch 1 includes diodes D11 to D18, inductors L11 and L12, switch tubes Q11 and Q12, and capacitors C11 and C12. The rectifier branch 2 includes diodes D21 to D28, inductors L21 and L22, switch tubes Q21 and Q22, and capacitors C21 and C22. The rectifier branch 3 includes diodes D31 to D38, inductors L31 and L32, switch tubes Q31 and Q32, and capacitors C31 and C32. The three-phase rectifier branches receive an input of a three-phase alternating current and applies a rectified direct current to a BUS.

The foregoing describes the uninterruptible power supplying methods according to the embodiments of the present invention, and the following describes uninterruptible power supplies according to the embodiments of the present invention separately with reference to FIG. 7 to FIG. 12.

Figure 7:
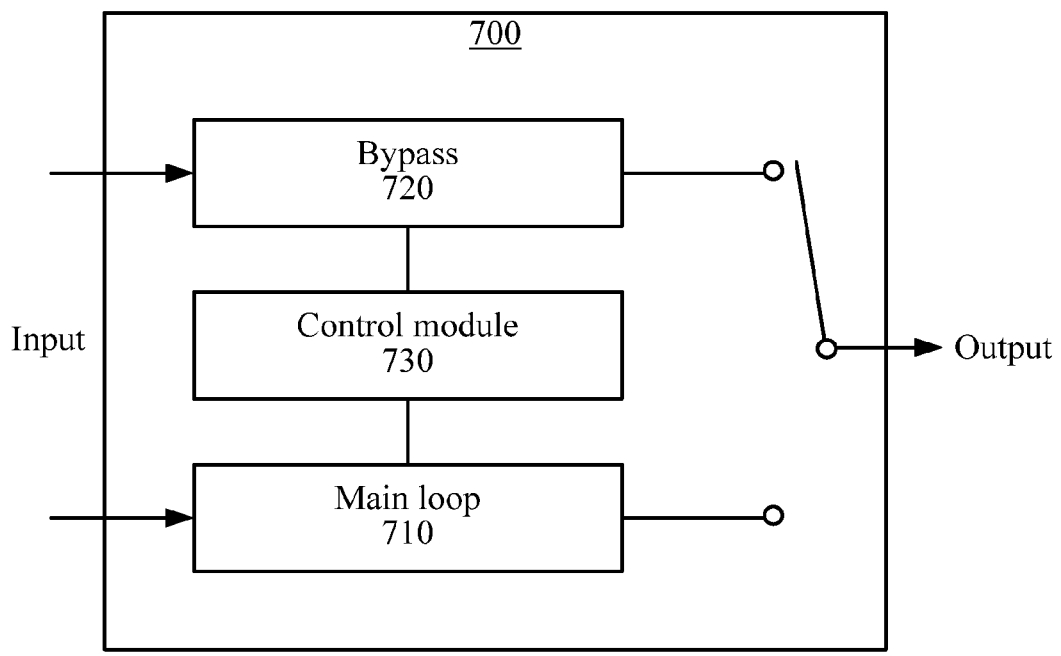
FIG. 7 is a schematic structural diagram of an uninterruptible power supply according to an embodiment of the present invention.

FIG. 7 is a schematic structural diagram of an uninterruptible power supply 700 according to an embodiment of the present invention. The uninterruptible power supply 700 includes a main loop 710, a bypass 720, and a control module 730.

The main loop 710 includes a rectifier circuit, an inverter circuit, an auxiliary power supply, and a charging circuit. The bypass 720 is configured to directly provide mains power for a load. The control module 730 is configured to switch the uninterruptible power supply 700 to a bypass working mode from a main loop working mode, so as to provide the mains power for the load through the bypass 720; determine the working mode of the uninterruptible power supply 700; and when the uninterruptible power supply 700 is switched to the bypass working mode from the main loop working mode and a voltage of a bus bar of the uninterruptible power supply 700 is higher than a first threshold, stop the rectifier circuit and/or a discharging circuit in the main loop 710 from working, and when it is determined that the voltage of the bus bar in the main loop 710 is lower than a second threshold, enable the rectifier circuit and/or the discharging circuit to work, where the first threshold is greater than the second threshold, and the first threshold and the second threshold are respectively an upper limit value and a lower limit value of a working voltage of the bus bar, or the first threshold and the second threshold are within a range of the working voltage of the bus bar.

According to this embodiment of the present invention, the control module 730 adjusts a working frequency of any one or more switch tubes in one or more circuits of the rectifier circuit, the discharging circuit, the auxiliary power supply, the charging circuit, and the inverter circuit to a second frequency from a first frequency.

According to this embodiment of the present invention, when an uninterruptible power supply is switched to run in a bypass working mode, a working frequency of a switch tube in a main loop of the uninterruptible power supply can decrease, thereby reducing working loss of the uninterruptible power supply and effectively improving working efficiency of the uninterruptible power supply.

Optionally, as another embodiment, the main loop 710 further includes a bus bar. When the uninterruptible power supply 700 is switched to the bypass working mode from the working mode of the main loop 710 and the voltage of the bus bar of the uninterruptible power supply 700 is higher than the first threshold, the control module 730 stops the rectifier circuit from working; when the voltage of the bus bar is lower than the second threshold, the control module 730 enables the rectifier circuit to work, where the rectifier circuit provides electric energy for the bus bar of the uninterruptible power supply 700, the inverter circuit extracts the electric energy from the bus bar, the first threshold is greater than the second threshold, and the first threshold and the second threshold are respectively the upper limit value and the lower limit value of the working voltage of the bus bar, or the first threshold and the second threshold are within the range of the working voltage of the bus bar.

Optionally, as another embodiment, when the uninterruptible power supply 700 is switched to the working mode of the bypass 720 from the working mode of the main loop 710 and the voltage of the bus bar of the uninterruptible power supply 700 is higher than the first threshold, the control module 730 stops the discharging circuit from working; when the voltage of the bus bar is lower than the second threshold, the control module 730 enables the discharging circuit to work, where the discharging circuit provides electric energy for the bus bar of the uninterruptible power supply 700, the inverter circuit extracts the electric energy from the bus bar, the first threshold is greater than the second threshold, and the first threshold and the second threshold are respectively the upper limit value and the lower limit value of the working voltage of the bus bar, or the first threshold and the second threshold are within the range of the working voltage of the bus bar.

Optionally, as another embodiment, the main loop 710 further includes a charger. The control module 730 determines an output voltage of the charger in the main loop 710; when the uninterruptible power supply 700 is switched to the bypass working mode from the main loop working mode and the output voltage of the charger in the main loop 710 is higher than a third threshold, the control module 730 stops the charger from providing power for the auxiliary power supply; when the output voltage of the charger is lower than a fourth threshold, the control module 730 enables the charger to provide power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

Optionally, as another embodiment, the main loop 710 includes multiple rectifier branches and multiple discharging branches; when the uninterruptible power supply 700 is switched to the bypass working mode from the main loop working mode, the control module 730 further stops at least one rectifier branch of the multiple rectifier branches in the main loop 710 from working, or stops at least one discharging branch of the multiple discharging branches in the main loop 710 from working.

Optionally, as another embodiment, when the uninterruptible power supply 700 is switched to the bypass working mode from the main loop working mode, the control module 730 further stops applying a drive signal to a switch tube of the inverter circuit, so as to stop the inverter circuit from working; when the bypass 720 is abnormal, the control module 730 provides the drive signal for the switch tube of the inverter circuit, so as to enable the inverter circuit to work.

For operations and functions of each unit of the uninterruptible power supply 700, reference may be made to the method in FIG. 2. To avoid repetition, details are not described herein again.

Figure 8:
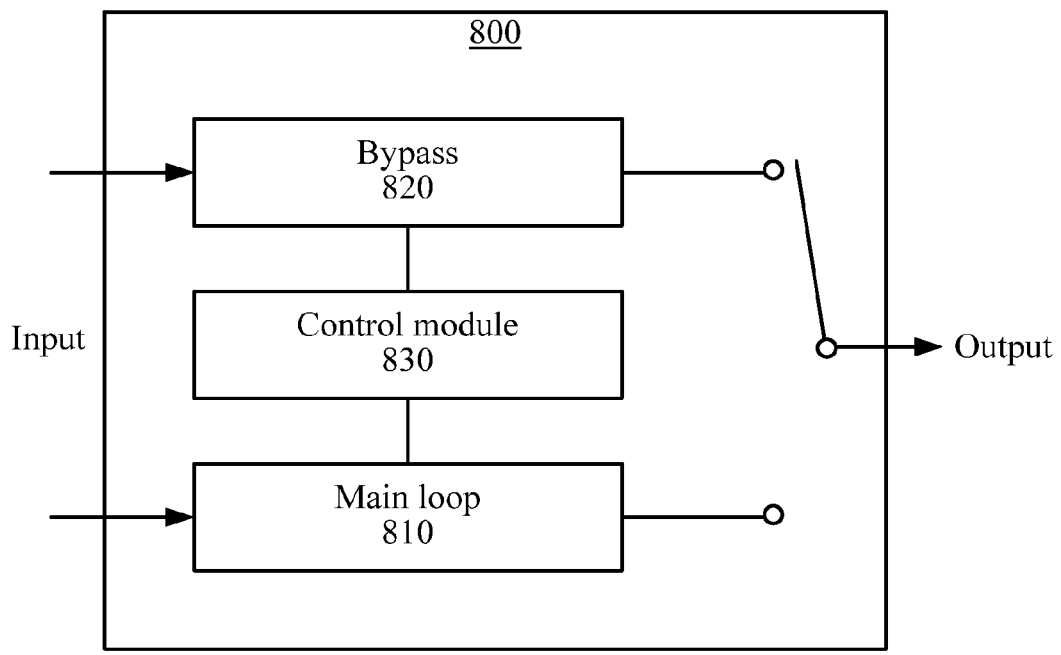
FIG. 8 is a schematic structural diagram of an uninterruptible power supply according to another embodiment of the present invention.

FIG. 8 is a schematic structural diagram of an uninterruptible power supply 800 according to another embodiment of the present invention. The uninterruptible power supply 800 includes a main loop 810, a bypass 820, and a control module 830.

The main loop 810 includes a rectifier circuit, a discharging circuit, a bus bar, and an inverter circuit, where the rectifier circuit provides electric energy for the bus bar, and the inverter circuit extracts the electric energy from the bus bar. The control module 830 is configured to switch the uninterruptible power supply 800 to a bypass working mode from a main loop working mode, so as to provide mains power for a load through the bypass 820; determine the working mode of the uninterruptible power supply 800; and when the uninterruptible power supply 800 is switched to the bypass working mode from the main loop working mode and a voltage of the bus bar of the uninterruptible power supply 800 is higher than a first threshold, stop the rectifier circuit and/or the discharging circuit in the main loop 810 from working, and when it is determined that the voltage of the bus bar in the main loop 810 is lower than a second threshold, enable the rectifier circuit and/or the discharging circuit to work, where the first threshold is greater than the second threshold, and the first threshold and the second threshold are respectively an upper limit value and a lower limit value of a working voltage of the bus bar, or the first threshold and the second threshold are within a range of the working voltage of the bus bar.

According to this embodiment of the present invention, when an uninterruptible power supply is switched to run in a bypass working mode, in a case in which it is determined that a voltage of a bus bar of the uninterruptible power supply is higher than a first threshold, a rectifier circuit and/or a discharging circuit is stopped from working; in a case in which it is determined that the voltage of the bus bar is lower than a second threshold, the rectifier circuit and/or the discharging circuit is enabled to work, thereby reducing working loss of the uninterruptible power supply and effectively improving working efficiency of the uninterruptible power supply.

Optionally, as another embodiment, the main loop 810 further includes a charger and an auxiliary power supply, where the charger of the uninterruptible power supply 800 provides power for the auxiliary power supply of the uninterruptible power supply 800. The control module 830 is further configured to determine an output voltage of the charger in the main loop 810; and when the uninterruptible power supply 800 is switched to the bypass working mode from the main loop working mode and the output voltage of the charger in the main loop 810 is higher than a third threshold, stop the charger from providing power for the auxiliary power supply, and when the output voltage of the charger is lower than a fourth threshold, provide power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

For operations and functions of each unit of the uninterruptible power supply 800, reference may be made to the method in FIG. 5. To avoid repetition, details are not described herein again.

Figure 9:
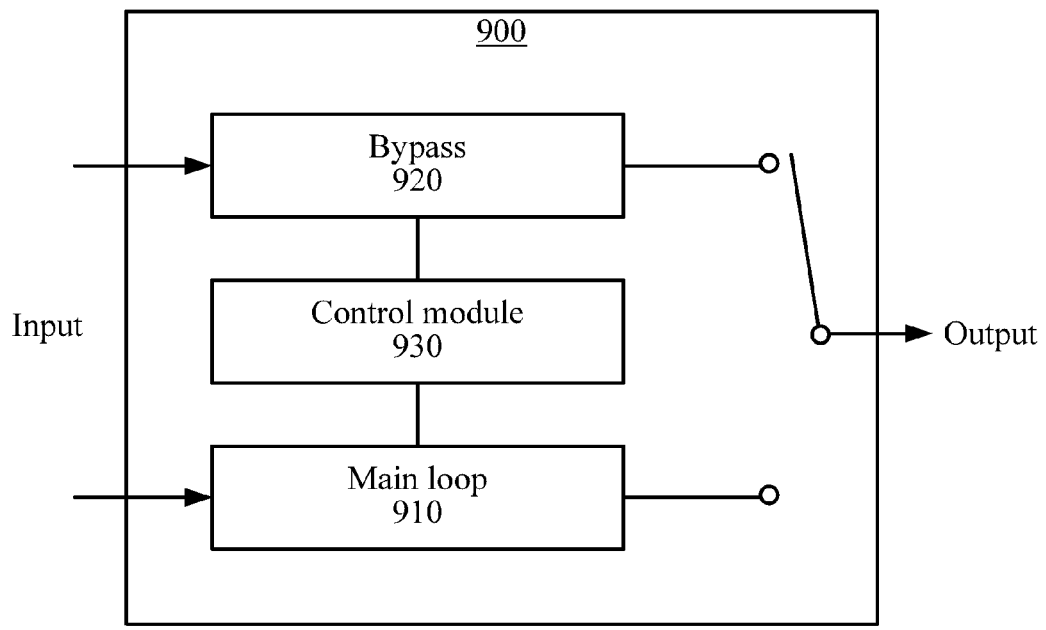
FIG. 9 is a schematic structural diagram of an uninterruptible power supply according to another embodiment of the present invention.

FIG. 9 is a schematic structural diagram of an uninterruptible power supply 900 according to another embodiment of the present invention. The uninterruptible power supply 900 includes a main loop 910, a bypass 920, and a control module 930.

The main loop 910 includes multiple rectifier branches and multiple discharging branches. The bypass 920 is configured to directly provide mains power for a load. The control module 930 is configured to switch the uninterruptible power supply 900 to a bypass working mode from a main loop working mode, so as to provide the mains power for the load through the bypass 920; determine the working mode of the uninterruptible power supply 900; and when the uninterruptible power supply 900 is switched to the bypass working mode from the main loop working mode, stop at least one rectifier branch of the multiple rectifier branches in the main loop 910 from working, or stop at least one discharging branch of the multiple discharging branches in the main loop 910 from working.

Optionally, as another embodiment, the main loop 910 further includes an inverter circuit. When the uninterruptible power supply 900 is switched to the bypass working mode from the main loop working mode, the control module 930 further stops applying a drive signal to a switch tube of the inverter circuit, so as to stop the inverter circuit from working; when the bypass 920 is abnormal, the control module 930 provides the drive signal for the switch tube of the inverter circuit, so as to enable the inverter circuit to work.

For operations and functions of each unit of the uninterruptible power supply 900, reference may be made to the method in FIG. 5. To avoid repetition, details are not described herein again.

Figure 10:
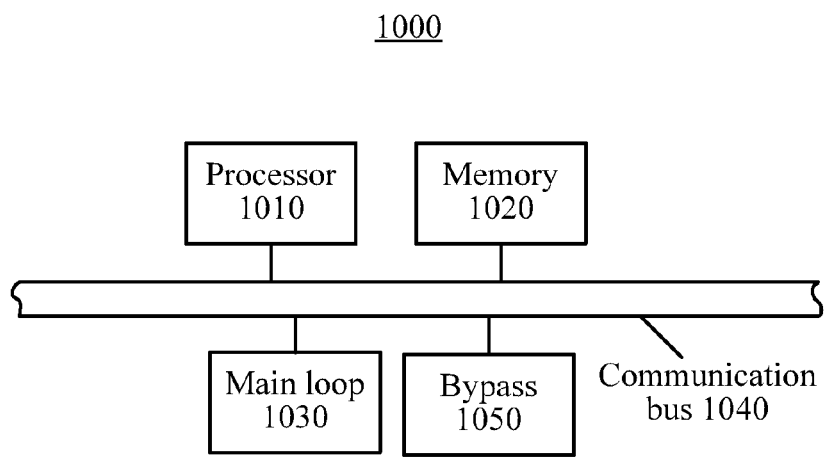
FIG. 10 is a schematic structural diagram of an uninterruptible power supply according to another embodiment of the present invention.

FIG. 10 is a schematic structural diagram of an uninterruptible power supply 1000 according to another embodiment of the present invention. The uninterruptible power supply 1000 includes a processor 1010, a memory 1020, a main loop 1030, a communication bus 1040, and a bypass 1050.

The processor 1010 invokes, using the communication bus 1040, code stored in the memory 1020, and is configured to switch the uninterruptible power supply 1000 to a bypass working mode from a main loop working mode, so as to provide mains power for a load through the bypass 1050; determine the working mode of the uninterruptible power supply 1000; and when the uninterruptible power supply 1000 is in the bypass working mode, adjust a working frequency of at least one switch tube in the main loop 1030 of the uninterruptible power supply 1000 to a second frequency from a first frequency, where the second frequency is less than the first frequency, so as to reduce power loss when the uninterruptible power supply 1000 is in the bypass working mode.

According to this embodiment of the present invention, when an uninterruptible power supply is switched to run in a bypass working mode, a working frequency of a switch tube in a main loop of the uninterruptible power supply can decrease, thereby reducing working loss of the uninterruptible power supply and effectively improving working efficiency of the uninterruptible power supply.

According to this embodiment of the present invention, the main loop 1030 includes a rectifier circuit, a discharging circuit, an auxiliary power supply, and an inverter circuit. The processor 1010 adjusts the working frequency of any one or more switch tubes of one or more circuits of the rectifier circuit, the discharging circuit, the auxiliary power supply, the charging circuit, and the inverter circuit to the second frequency from the first frequency.

Optionally, as another embodiment, the main loop 1030 further includes a bus bar. The rectifier circuit and the discharging circuit provide electric energy for the bus bar of the uninterruptible power supply 1000. The inverter circuit extracts the electric energy from the bus bar. When the uninterruptible power supply 1000 is switched to the bypass working mode from the main loop working mode and a voltage of the bus bar of the uninterruptible power supply 1000 is higher than a first threshold, the processor 1010 stops the rectifier circuit from working; when the voltage of the bus bar is lower than a second threshold, the processor 1010 enables the rectifier circuit to work, where the rectifier circuit provides electric energy for the bus bar of the uninterruptible power supply 1000, the inverter circuit extracts the electric energy from the bus bar, the first threshold is greater than the second threshold, and the first threshold and the second threshold are respectively an upper limit value and a lower limit value of a working voltage of the bus bar, or the first threshold and the second threshold are within a range of the working voltage of the bus bar. Alternatively, when the uninterruptible power supply 1000 is switched to the bypass working mode from the main loop working mode and a voltage of the bus bar of the uninterruptible power supply 1000 is higher than a first threshold, the processor 1010 stops the discharging circuit from working; when the voltage of the bus bar is lower than a second threshold, the processor 1010 enables the discharging circuit to work, where the discharging circuit provides electric energy for the bus bar of the uninterruptible power supply 1000, the inverter circuit extracts the electric energy from the bus bar, the first threshold is greater than the second threshold, and the first threshold and the second threshold are respectively an upper limit value and a lower limit value of a working voltage of the bus bar, or the first threshold and the second threshold are within a range of the working voltage of the bus bar.

Optionally, as another embodiment, the main loop 1030 further includes a charger. The processor 1010 further determines an output voltage of the charger in the main loop 1030; when the uninterruptible power supply 1000 is switched to the bypass working mode from the main loop working mode and the output voltage of the charger in the main loop 1030 is higher than a third threshold, the processor 1010 stops the charger from providing power for the auxiliary power supply; when the output voltage of the charger is lower than a fourth threshold, the processor 1010 enables the charger to provide power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

Optionally, as another embodiment, the main loop 1030 includes multiple rectifier branches and multiple discharging branches; when the uninterruptible power supply 1000 is switched to the bypass working mode from the main loop working mode, the processor 1010 further stops at least one rectifier branch of the multiple rectifier branches in the main loop 1030 from working, or stops at least one discharging branch of the multiple discharging branches in the main loop 1030 from working.

Optionally, as another embodiment, when the uninterruptible power supply 1000 is switched to the bypass working mode from the main loop working mode, the processor 1010 further stops applying a drive signal to a switch tube of the inverter circuit, so as to stop the inverter circuit from working; when the bypass 1050 is abnormal, the processor 1010 provides the drive signal for the switch tube of the inverter circuit, so as to enable the inverter circuit to work.

For operations and functions of each unit of the uninterruptible power supply 1000, reference may be made to the method in FIG. 2. To avoid repetition, details are not described herein again.

Figure 11:
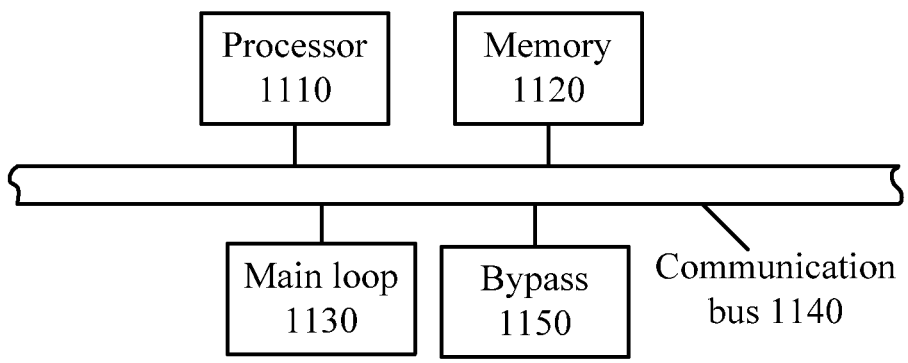
FIG. 11 is a schematic structural diagram of an uninterruptible power supply according to another embodiment of the present invention.

FIG. 11 is a schematic structural diagram of an uninterruptible power supply 1100 according to another embodiment of the present invention. The uninterruptible power supply 1100 includes a processor 1110, a memory 1120, a main loop 1130, a communication bus 1140, and a bypass 1150.

The main loop 1130 includes a rectifier circuit, a discharging circuit, a bus bar, and an inverter circuit, where the rectifier circuit provides electric energy for the bus bar, and the inverter circuit extracts the electric energy from the bus bar. The bypass 1150 is configured to directly provide mains power for a load. The processor 1110 invokes, using the communication bus 1140, code stored in the memory 1120, and is configured to switch the uninterruptible power supply 1100 to a bypass working mode from a main loop working mode, so as to provide the mains power for the load through the bypass 1150; determine the working mode of the uninterruptible power supply 1100; and when the uninterruptible power supply 1100 is switched to the bypass working mode from the main loop working mode and a voltage of the bus bar of the uninterruptible power supply 1100 is higher than a first threshold, stop the rectifier circuit and/or the discharging circuit in the main loop 1130 from working, and when it is determined that the voltage of the bus bar in the main loop 1130 is lower than a second threshold, enable the rectifier circuit and/or the discharging circuit to work, where the first threshold is greater than the second threshold, and the first threshold and the second threshold are respectively an upper limit value and a lower limit value of a working voltage of the bus bar, or the first threshold and the second threshold are within a range of the working voltage of the bus bar.

According to this embodiment of the present invention, when an uninterruptible power supply is switched to run in a bypass working mode, in a case in which it is determined that a voltage of a bus bar of the uninterruptible power supply is higher than a first threshold, a rectifier circuit and/or a discharging circuit is stopped from working; in a case in which it is determined that the voltage of the bus bar is lower than a second threshold, the rectifier circuit and/or the discharging circuit is enabled to work, thereby reducing working loss of the uninterruptible power supply and effectively improving working efficiency of the uninterruptible power supply.

Optionally, as another embodiment, the main loop 1130 further includes a charger and an auxiliary power supply, where the charger of the uninterruptible power supply 1100 provides power for the auxiliary power supply of the uninterruptible power supply 1100. The processor 1110 is further configured to determine an output voltage of the charger in the main loop 1130; and when the uninterruptible power supply 1100 is switched to the bypass working mode from the main loop working mode and the output voltage of the charger in the main loop 1130 is higher than a third threshold, stop the charger from providing power for the auxiliary power supply, and when the output voltage of the charger is lower than a fourth threshold, provide power for the auxiliary power supply again, where the charger provides power for the auxiliary power supply, the third threshold is greater than the fourth threshold, and the third threshold and the fourth threshold are respectively an upper limit value and a lower limit value of a working voltage of the auxiliary power supply, or the third threshold and the fourth threshold are within a range of the working voltage of the auxiliary power supply.

For operations and functions of each unit of the uninterruptible power supply 1100, reference may be made to the method in FIG. 5. To avoid repetition, details are not described herein again.

Figure 12:
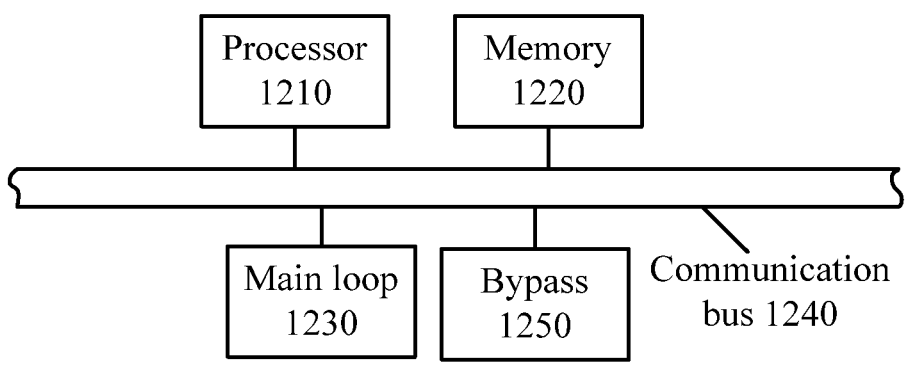
FIG. 12 is a schematic structural diagram of an uninterruptible power supply according to another embodiment of the present invention.

FIG. 12 is a schematic structural diagram of an uninterruptible power supply 1200 according to another embodiment of the present invention. The uninterruptible power supply 1200 includes a processor 1210, a memory 1220, a main loop 1230, a communication bus 1240, and a bypass 1250.

The main loop 1230 includes multiple rectifier branches and multiple discharging branches. The bypass 1250 is configured to directly provide mains power for a load. The processor 1210 invokes, using the communication bus 1240, code stored in the memory 1220, and is configured to switch the uninterruptible power supply 1200 to a bypass working mode from a main loop working mode, so as to provide the mains power for the load through the bypass 1250; determine the working mode of the uninterruptible power supply 1200; and when the uninterruptible power supply 1200 is switched to the bypass working mode from the main loop working mode, stop at least one rectifier branch of the multiple rectifier branches in the main loop 1230 from working, or stop at least one discharging branch of the multiple discharging branches in the main loop 1230 from working.

According to this embodiment of the present invention, when an uninterruptible power supply is switched to run in a bypass working mode, in a case in which it is determined that a voltage of a bus bar of the uninterruptible power supply is higher than a first threshold, at least one rectifier branch of multiple rectifier branches or at least one discharging branch of multiple discharging branches in the uninterruptible power supply is stopped from working, thereby reducing working loss of the uninterruptible power supply and effectively improving working efficiency of the uninterruptible power supply.

Optionally, as another embodiment, the main loop 1230 further includes an inverter circuit. When the uninterruptible power supply 1200 is switched to the bypass working mode from the main loop working mode, the processor 1210 further stops applying a drive signal to a switch tube of the inverter circuit, so as to stop the inverter circuit from working; when the bypass 1250 is abnormal, the processor 1210 provides the drive signal for the switch tube of the inverter circuit, so as to enable the inverter circuit to work.

For operations and functions of each unit of the uninterruptible power supply 1200, reference may be made to the method in FIG. 5. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An uninterruptible power supplying method comprising:
   switching an uninterruptible power supply to a bypass working mode from a main loop working mode, so as to provide mains power for a load through a bypass;
   determining a working mode of the uninterruptible power supply; and adjusting a working frequency of at least one switch tube in a main loop of the uninterruptible power supply to a second frequency from a first frequency when the uninterruptible power supply is in the bypass working mode, wherein the second frequency is less than the first frequency.

2. The method according to claim 1, wherein adjusting the working frequency of the at least one switch tube in the main loop of the uninterruptible power supply to the second frequency from the first frequency comprises adjusting the working frequency of any one or more switch tubes in one or more circuits of a rectifier circuit, a discharging circuit, an auxiliary power supply, a charging circuit, and an inverter circuit in the main loop to the second frequency from the first frequency, wherein the rectifier circuit is configured to provide a direct current for the inverter circuit, wherein the charging circuit is configured to charge a rechargeable battery of the uninterruptible power supply, wherein the discharging circuit is configured to discharge the rechargeable battery to provide a direct current for the inverter circuit, wherein the inverter circuit is configured to convert, the direct current into an alternating current to provide the alternating current for the load, and wherein the auxiliary power supply is configured to provide a working power supply for the uninterruptible power supply.

3. The method according to claim 2, further comprising:
stopping the rectifier circuit from working when the uninterruptible power supply is switched to the bypass working mode from the main loop working mode and a voltage of a bus bar of the uninterruptible power supply is higher than or equal to a first threshold; and
enabling the rectifier circuit to work when the voltage of the bus bar is lower than or equal to a second threshold, wherein the rectifier circuit provides electric energy for the bus bar of the uninterruptible power supply, wherein the inverter circuit obtains the electric energy from the bus bar, wherein the first threshold is greater than the second threshold, and wherein the first threshold and the second threshold are within a range of a working voltage of the bus bar.

4. The method according to claim 3, wherein the first threshold and the second threshold are respectively an upper limit value and a lower limit value of the working voltage of the bus bar.

5. The method according to claim 2, further comprising:
stopping the discharging circuit from working when the uninterruptible power supply is switched to the bypass working mode from the main loop working mode and a voltage of a bus bar of the uninterruptible power supply is higher than or equal to a first threshold; and
enabling the discharging circuit to work when the voltage of the bus bar is lower than or equal to a second threshold, wherein the discharging circuit provides electric energy for the bus bar of the uninterruptible power supply, wherein the inverter circuit obtains the electric energy from the bus bar, wherein the first threshold is greater than the second threshold, and wherein the first threshold and the second threshold are within a range of a working voltage of the bus bar.

6. The method according to claim 2, further comprising:
determining an output voltage of a charger in the main loop;
stopping the charger from providing power for the auxiliary power supply when the uninterruptible power supply is switched to the bypass working mode from the main loop working mode and the output voltage of the charger in the main loop is higher than or equal to a third threshold; and
enabling the charger to provide power for the auxiliary power supply when the output voltage of the charger is lower than or equal to a fourth threshold, wherein the third threshold is greater than the fourth threshold, and wherein the third threshold and the fourth threshold are within a range of a working voltage of the auxiliary power supply.

7. The method according to claim 6, wherein the third threshold and the fourth threshold are respectively an upper limit value and a lower limit value of the working voltage of the auxiliary power supply.

8. The method according to claim 2, farther comprising stopping at least one rectifier branch of multiple rectifier branches in the main loop from working when the uninterruptible power supply is switched to the bypass working mode from the main loop working mode, wherein the main loop comprises the multiple rectifier branches and multiple discharging branches connected in parallel to the bypass, and wherein the multiple rectifier branches and the multiple discharging branches are configured to provide the uninterruptible power supply.

9. The method according to claim 2, further comprising stopping at least one discharging branch of multiple discharging branches in the main loop from working, wherein the main loop comprises the multiple rectifier branches and multiple discharging branches connected in parallel to the bypass, and wherein the multiple rectifier branches and the multiple discharging branches are configured to provide the uninterruptible power supply.

10. The method according to claim 2 further comprising:
stopping applying a drive signal to a switch tube of the inverter circuit when the uninterruptible power supply is switched to the bypass working mode from the main loop working mode, so as to stop the inverter circuit from working; and
providing the drive signal for the switch tube of the inverter circuit when the bypass is abnormal, so as to enable the inverter circuit to work.

11. An uninterruptible power supply comprising:
a main loop comprising a rectifier circuit, a discharging circuit, an inverter circuit, an auxiliary power supply, and a charging circuit, wherein the rectifier circuit is coupled to the inverter circuit and configured to provide a direct current for the inverter circuit, wherein the charging circuit is configured to charge a rechargeable battery of the uninterruptible power supply, wherein the discharging circuit is coupled to the inverter circuit and configured to discharge the rechargeable battery to provide a direct current for the inverter circuit, wherein the inverter circuit is configured to convert the direct current into an alternating current to provide the alternating current for a load, and wherein the auxiliary power supply is coupled to the rechargeable battery and configured to provide a working power supply for the uninterruptible power supply;
a bypass configured to provide mains power for the load when the uninterruptible power supply is in a bypass working mode; and
a control module coupled to the main loop and the bypass and configured to:
determine a working mode of the uninterruptible power supply; and
adjust a working frequency of at least one switch tube in the main loop of the uninterruptible power supply to a second frequency from a first frequency when the uninterruptible power supply is in the bypass working mode, wherein the second frequency is less than the first frequency.

12. The uninterruptible power supply according to claim 11, wherein the control module adjusts the working frequency of any one or more switch tubes in one or more circuits of the rectifier circuit, the discharging circuit, the auxiliary power supply, the charging circuit, and the inverter circuit into the second frequency from the first frequency.

13. The uninterruptible power supply according to claim 12, wherein the main loop further comprises a bus bar, wherein the bus bar is connected to an output end of the rectifier circuit, an output end of the discharging circuit, and an input end of the inverter circuit, wherein the control module is further configured to:
    stop the rectifier circuit from working when the uninterruptible power supply is switched to the bypass working mode from the main loop working mode and a voltage of the bus bar is higher than or equal to a first threshold; and
    enable the rectifier circuit to work when the voltage of the bus bar is lower than or equal to a second threshold, wherein the rectifier circuit provides electric energy for the bus bar, the inverter circuit obtains the electric energy from the bus bar, wherein the first threshold is greater than the second threshold, and wherein the first threshold and the second threshold are within a range of a working voltage of the bus bar.

14. The uninterruptible power supply according to claim 13, wherein the first threshold and the second threshold are respectively an upper limit value and a lower limit value of the working voltage of the bus bar.

15. The uninterruptible power supply according to claim 12, wherein the main loop further comprises a bus bar, wherein the bus bar is connected to an output end of the rectifier circuit, an output end of the discharging circuit, and an input end of the inverter circuit, wherein the control module is further configured to:
    stop the discharging circuit from working when the uninterruptible power supply is switched to the bypass working mode from the main loop working mode and a voltage of the bus bar is higher than or equal to a first threshold; and
    enable the discharging circuit to work when the voltage of the bus bar is lower than or equal to a second threshold, wherein the discharging circuit provides electric energy for the bus bar of the uninterruptible power supply, wherein the inverter circuit obtains the electric energy from the bus bar, wherein the first threshold is greater than the second threshold, and wherein the first threshold and the second threshold are within a range of a working voltage of the bus bar.

16. The uninterruptible power supply according to claim 11, wherein the main loop further comprises a charger coupled to the chargeable battery, wherein the charger is configured to charge the rechargeable battery using mains power in the bypass working mode, wherein the control module is further configured to:
    determine an output voltage of the charger in the main loop;
    stop the charger from providing power for the auxiliary power supply when the uninterruptible power supply is switched to the bypass working mode from the main loop working mode and the output voltage of the charger in the main loop is higher than or equal to a third threshold; and
    enable the charger to provide power for the auxiliary power supply when the output voltage of the charger is lower than or equal to a fourth threshold, wherein the third threshold is greater than the fourth threshold, and wherein the third threshold and the fourth threshold are within a range of a working voltage of the auxiliary power supply.

17. The uninterruptible power supply according to claim 16, wherein the third threshold and the fourth threshold are respectively an upper limit value and a lower limit value of the working voltage of the auxiliary power supply.

18. The uninterruptible power supply according to claim 11, wherein the main loop comprises multiple rectifier branches and multiple discharging branches connected in parallel to the bypass, wherein the multiple rectifier branches and the multiple discharging branches are configured to provide the uninterruptible power supply, wherein the control module is further configured to stop at least one rectifier branch of the multiple rectifier branches in the main loop from working when the uninterruptible power supply is switched to the bypass working mode from the main loop working mode.

19. The uninterruptible power supply according to claim 11, wherein the main loop comprises multiple rectifier branches and multiple discharging branches connected in parallel to the bypass, wherein the multiple rectifier branches and the multiple discharging branches are configured to provide the uninterruptible power supply, wherein the control module is further configured to stop at least one discharging branch of the multiple discharging branches in the main loop from working when the uninterruptible power supply is switched to the bypass working mode from the main loop working mode.

20. The uninterruptible power supply according to claim 11, wherein the control module is further configured to:
    stop applying a drive signal to a switch tube of the inverter circuit when the uninterruptible power supply is switched to the bypass working mode from the main loop working mode, so as to stop the inverter circuit from working; and
    provide the drive signal for the switch tube of the inverter circuit when the bypass is abnormal, so as to enable the inverter circuit to work.

* * * * *

UNITED STATES PATENT AND TRADEMARK OFFICE
CERTIFICATE OF CORRECTION

PATENT NO. : 9,729,007 B2  
APPLICATION NO. : 14/549389  
DATED : August 8, 2017  
INVENTOR(S) : Yang Cheng, Peiguo Liu and Mita Cai It is certified that error appears in the above-identified patent and that said Letters Patent is hereby corrected as shown below:

In the Claims

Column 24, Line 15, Claim 8 should read:  
The method according to claim 2, further comprising Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*